(12) United States Patent
Nilsson et al.

(10) Patent No.: US 8,472,316 B2
(45) Date of Patent: Jun. 25, 2013

(54) UTILIZATION OF DATA LINKS

(75) Inventors: Mattias Nilsson, Malmö (SE); Tibor Rathonyi, Stockholm (SE); Mats Sågfors, Kyrkslätt (FI); Henning Wiemann, Aachen (DE)

(73) Assignee: Tekefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/678,703

(22) PCT Filed: Sep. 9, 2008

(86) PCT No.: PCT/EP2008/061928
§ 371 (c)(1),
(2), (4) Date: Jun. 18, 2010

(87) PCT Pub. No.: WO2009/037152
PCT Pub. Date: Mar. 26, 2009

(65) Prior Publication Data
US 2011/0058475 A1  Mar. 10, 2011

Related U.S. Application Data

(60) Provisional application No. 61/031,499, filed on Feb. 26, 2008, provisional application No. 60/973,920, filed on Sep. 20, 2007.

(30) Foreign Application Priority Data

Feb. 19, 2008   (EP) ..................................... 08003010

(51) Int. Cl.
*H04L 1/00* (2006.01)
(52) U.S. Cl.
USPC .......................................................... 370/230

(58) Field of Classification Search
USPC .................................. 370/229, 230, 412, 394
See application file for complete search history.

(56) References Cited

U.S. PATENT DOCUMENTS 7,768,919 B1 * 8/2010 Conway ......................... 370/232
8,036,124 B1 * 10/2011 Motwani ....................... 370/235

FOREIGN PATENT DOCUMENTS

| CN | 101022537 A | 8/2007 |
|---|---|---|
| GB | 2372172 A | 8/2002 |

OTHER PUBLICATIONS

EPO, Int'l Search Report in PCT/EP2008/061928, Jan. 21, 2009.
EPO, Written Opinion in PCT/EP2008/061928, Jan. 21, 2009.
L. Tao et al., Weighted Fair Discard Scheme for Buffer Management in the Presence of Network Congestion, Computer Communications, Jun. 15, 2002, pp. 944-953, vol. 25, No. 10, Elsevier Science Publishers BV, Amsterdam, NL.
China Patent Office, Action in CN200880107947.5, Dec. 1, 2011.

* cited by examiner

*Primary Examiner* — Chandrahas Patel
(74) *Attorney, Agent, or Firm* — Potomac Patent Group PLLC

(57) ABSTRACT

Control of a data packet buffer in a communication system and a data packet queue in a transmission link are shown. The queue stores a plurality of received data packets that are intended for transmission over a wireless interface. Selected packets are discarded from the queue without the selected packets having been transmitted. A packet is selected for discarding depending on at least the length of time the packet has been stored in the queue. The discarding of a selected packet is effectuated on condition that at least a predetermined time period has elapsed since a previous discarding of a packet has taken place. Such a solution is advantageous in that, for varying transmission bandwidth conditions in the transmission link, it is possible to achieve good link utilization and throughput, while at the same time enabling a low end-to-end delay for packets transmitted in the link.

17 Claims, 3 Drawing Sheets

UTILIZATION OF DATA LINKS

TECHNICAL FIELD

The present invention relates to control of a data packet buffer in a communication system.

BACKGROUND

In data packet based communication systems, i.e. systems in which information to be transmitted is divided into a plurality of packets and the individual packets are sent over a communication link, it is known to provide queue buffers at various points in the network. A buffer may be an ending or input buffer (i.e. a buffer for data packets that are to be sent over a link) or a receiving or output buffer (i.e. buffer for data packets that have already been sent over a link).

Packets for transporting data may be called by any of a variety of names, such as protocol data packets, frames, segments, cells, etc., depending on specific context, the specific protocol used, and certain other conventions. In the context of the present document, such packets of data are typically referred to as data packets. The procedures for placing data packets into a queue, advancing them in queue, and removing data packets from the queue are referred to as "queue management".

A phenomenon that is known in data packet transmission networks is that of congestion. Congestion implies a state in which it is not possible to readily handle the number of data packets that are required to be transported over that connection or link. As a consequence of congestion at a given link, the number of data packets in a queue buffer associated with said link will increase. In response to a congestion condition, it is known to implement a data packet dropping mechanism referred to as "drop-on-full". According to this mechanism, upon receipt of data packet at the queue buffer, a queue length related parameter, such as the actual queue length or the average queue length, is compared to a predetermined threshold. If the predetermined threshold is exceeded, then a data packet is dropped. The threshold indicates the "full" state of the queue.

The data packet which is dropped may be the newly arrived packet, in which case the mechanism is called "tail-drop". Besides the technique of tail-drop, it is also known to perform a so-called "random-drop", where a data packet already in the queue is selected according to random function, or so-called "front-drop", where the first data packet in the queue is dropped. Such drop-on-full mechanisms not only serve to reduce the load on the congested link, but also serve as an implicit congestion notification to the source and/or destination of the data packet.

Such queue management will be discussed in this document, and examples that will be described in some detail will involve a mobile broadband environment. Currently, upgrades of the third generation (3G) wideband code division multiple access (WCDMA) technology are performed to provide higher data rates for both the downlink and the uplink channel. The first phase is mainly targeted at higher downlink rates up to 14 Mbps. This is already implemented in commercial networks and referred to as high speed downlink packet access (HSDPA). Higher uplink rates, up to 6 Mbps, will soon be provided by high speed uplink packet access (HSUPA), which is also known as Enhanced Uplink (EUL). This combination of HSDPA and HSUPA is commonly referred to as high speed packet access (HSPA).

The standardization work of further upgrades of 3G systems is currently in progress to provide even higher data rates and decreased transmission delays. These will be achieved by further enhancements to HSPA (e-HSPA) which are still based on WCDMA. The Long Term Evolution (LTE) will allow utilizing wider frequency bands. Common for these technologies are the existence of a high speed wireless link that is shared by all mobile terminals in a cell. The transmission on this shared channel is controlled from the network by a scheduler that works according to network specific algorithms. The scheduler transmits channel access grants to the terminals in the cell to control who is allowed to use the shared channel. This access grant process signaling is very fast and access grant may be changed between users several times per second. The scheduler algorithm, the number of active terminals and the current radio resource situation in the cell is unknown to the mobile terminal. This results in that the wireless link as seen from a mobile terminal can have large rate variations and may in worst case change from several Mbps to a few hundred Kbps several times every second.

Regardless of the enhanced data rates that these upgrades provide, the wireless link is likely still the bottleneck of an end-to-end connection. With varying radio conditions and varying bandwidth in the wireless link the uplink buffer in the mobile terminal will have a varying queue size. Some kind of management of the buffer is therefore needed to achieve good link utilization and low delays. The most straightforward approach would be to let all incoming data be buffered regardless of the link conditions. However, this approach has many drawbacks. First of all, the buffer capacity is physically limited. Furthermore, a number of problems are experienced with having large queues, such as excessive end-to-end packet delays, unfairness between competing flows, latency induced to other traffic sharing the same buffer, and slow reactivity in web surfing. To keep the size of the queue "appropriate", a scheme for managing queue buffers is hence needed.

Prior art solutions include a packed discard prevention counter algorithm (PDPC) for traditional WCDMA links (e.g. a dedicated channel is assigned per TCP flow) as shown in Sagfors M., Ludwig R., Meyer M., Peisa J., "Queue Management for TCP Traffic over 3G Links", IEEE, March 2003, and Sagfors M., Ludwig R., Meyer M., Peisa J., "Buffer Management for Rate-Varying 3G Wireless Links Supporting TCP Traffic, IEEE, April 2003.

Furthermore, WO-02098153 A1 describes a method of managing a data packet queue in a buffer. Having defined minimum and maximum threshold levels for the packet queue, the method will for those data packets that are received by the buffer, perform a congestion avoidance procedure when the threshold exceeds the maximum level or when the buffer queue lies between the defined levels. And further not perform a congestion avoidance procedure when the buffer queue is less than the minimum threshold.

However, these prior art disclosures have a drawback in that the link over which buffered packets are to be transmitted runs a risk of being under-utilized. That is, to ensure that the link is fully utilized after a packet drop the TCP pipe capacity (the minimum amount of data a TCP flow needs to have in flight to fully utilize the bandwidth of the bottle-neck interface) needs to be buffered at the time of the packet drop. Since the pipe capacity is very dependent on the bandwidth of the link, such prior art solutions are not optimal in environments where the bandwidth of the link may vary on a short time scale.

SUMMARY

In order to improve on prior art solutions there is provided, according to a first aspect, a method for controlling a data packet queue in a transmission link in a communication system. In the queue there is stored a plurality of received data packets that are intended for transmission over a wireless interface. The method involves discarding selected packets from the queue without the selected packets having been transmitted. A packet is selected for discarding depending on at least the length of time the packet has been stored in the queue. The discarding of a selected packet is effectuated on condition that at least a predetermined time period has elapsed since a previous discarding of a packet has taken place.

Such a solution is advantageous in that, for varying transmission bandwidth conditions in the transmission link, it is possible to achieve good link utilization and throughput, while at the same time enabling a low end-to-end delay for packets transmitted in the link. This is achieved because it has been found that the length of time the packet has been stored in the queue is to a large extent independent of the instantaneous data rate in the link, and dropping of multiple packets from one and the same transmission window can be avoided by the condition that at least a predetermined time period elapses between the discarding packets.

Embodiments may comprise a number of operations, involving calculating a time period since a packet was discarded from the queue without having been transmitted and, for each packet of at least a subset of the packets in the queue, calculating a time period during which the packet has been stored in the queue. If, for said each packet, the time period during which the packet has been stored in the queue is larger than a first threshold and the time period since a packet was discarded from the queue without having been transmitted is larger than a second threshold value, the packet is discarded.

Embodiments may also comprise those where, for said each packet, if the time period during which the packet has been stored in the queue is larger than a third threshold, the packet is discarded.

The discarding of packets may be prevented in case the number of packets stored in the queue is less than a fourth threshold value.

Embodiments may include calculation of a round trip time that is characteristic of the wireless interface, and assigning at least the calculated round trip time to the first threshold.

Using terminology of, and exemplifying with an implementation in, a TCP/IP environment, i.e. the queue storing TCP/IP packets for transmission via lower layer transmission link (including the wireless interface) to a corresponding TCP/IP receiving entity, a number of advantages over prior art solutions are found. By conditioning the discarding of a queued packet on the second threshold value, the amount of dropped data is reduced and therefore also the probability of dropping a TCP retransmission is reduced and thereby avoiding TCP retransmission timeouts (RTO:s).

With respect to the use of the third threshold value, being a parameter that may control discarding of packets that have been stored in the queue for a time period longer than this threshold value regardless of any conditions set on the discarding by the second threshold value, it may control discarding of "stale" packets in the queue. That is, by applying the third threshold value it is possible to provide for TCP retransmissions that follow an RTO enter a short queue and thereby obtaining a low probability of being subject to a repeated timeout.

With respect to the use of the fourth threshold value, being a parameter that may prevent discarding of packets from the queue if the queue is short, an advantage can be seen considering that, in a low bandwidth situation, packets will stay longer in the queue than with a higher bandwidth. The use of the fourth threshold value prevents discarding of packets such that a situation with an empty queue is avoided, which is advantageous since a situation with an empty queue may sub-optimize the level of utilization of the transmission link.

Moreover, the storing of received data packets may involve storing of packets intended for transmission over an uplink in a mobile communication system, and the storing of received data packets may also involve storing of packets intended for transmission over a downlink in a mobile communication system.

Embodiments include those where the first threshold is in the interval 0.25 to 0.30 seconds, the second threshold is in the interval 0.095 to 0.105 seconds, the third threshold is in the interval 1.1 to 1.3 seconds, and the fourth threshold is at least 3 packets, for example in the interval 5 to 6 packets. Such embodiments have the advantage that link utilization and throughput are optimized, while at the same time a low end-to-end delay for packets transmitted in the link is achieved.

In a second aspect, there is provided an apparatus configured to control a data packet queue memory connected to a transmission link in a communication system. The queue memory is configured to store a plurality of received data packets intended for transmission over a wireless interface in the communication system. The apparatus is configured to discard selected packets from the queue memory without the selected packets having been transmitted. The configuration is such that the apparatus is capable of selecting a packet depending on at least the length of time the packet has been stored in the queue, and further configured such that it is capable of discarding a selected packet on condition that at least a predetermined time period has elapsed since a previous discarding of a packet has taken place.

The apparatus according to the second aspect may, according to a third aspect, be comprised in a mobile communication terminal, and a computer program according to a fourth aspect may comprise software instructions that, when executed in a computer, performs the method according to the first aspect. These further aspects provide corresponding effects and advantages as discussed above in connection with the first aspect.

BRIEF DESCRIPTION OF THE DRAWINGS

Embodiments will now be described with reference to the attached drawings, where.

DETAILED DESCRIPTION OF EMBODIMENTS

Figure 1:
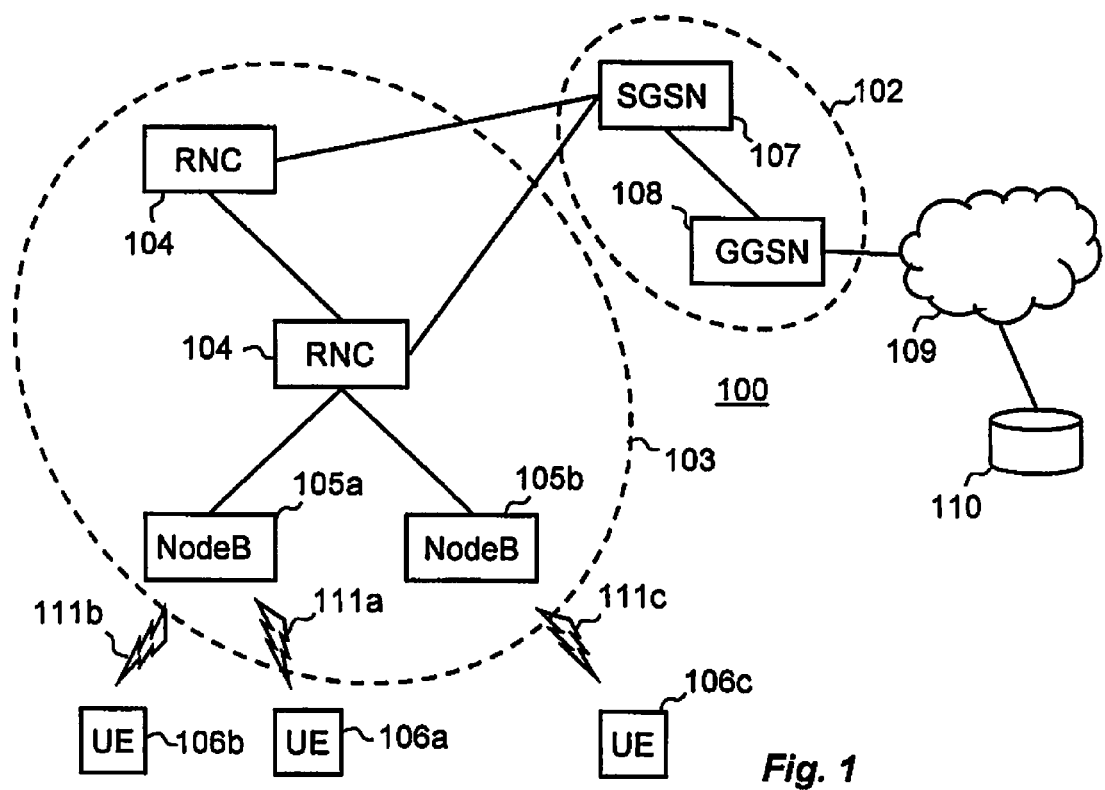
FIG. 1 schematically illustrates a communication system.

FIG. 1 illustrates schematically a universal mobile telecommunications system (UMTS) network 100 in which the above summarized method, arrangement and software may be implemented. It should be noted, however, that the skilled person will readily be able to perform implementations in other similar communication systems where queuing of data packets are necessary.

In FIG. 1 the UMTS network 100 comprises a core network 102 and a UMTS terrestrial radio access network (UTRAN) 103. The UTRAN 103 comprises a number of radio network controllers (RNC) 104, each of which is coupled to a set of neighboring base transceiver stations (BTS) 105. BTS's are sometimes referred to as Node B's. Each Node B 105 is responsible for a given geographical cell and the controlling RNC 104 is responsible for routing user and signaling data between that Node B 105 and the core network 102. All of the RNC's 104 are coupled to one another. A general outline of the UTRAN 103 is given in "Technical Specification TS 25.401 V3.2.0 of the 3rd Generation Partnership Project".

FIG. 1 also illustrates mobile devices or user equipment (UE) 106a-c connected to a respective Node B 105a-b in the UTRAN 103 via a respective air interface 111a-c, a serving GPRS support node (SGSN) 107 and a GPRS gateway support node (GGSN) 108. Mobile devices served by one Node B, such as devices 106a and 106b served by Node B 105a, are located in a so-called radio cell. The SGSN 107 and the GGSN 108 provide packet switched data services to the UE 106 via the UTRAN 103, with the GGSN 108 being coupled to the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Figure 2:
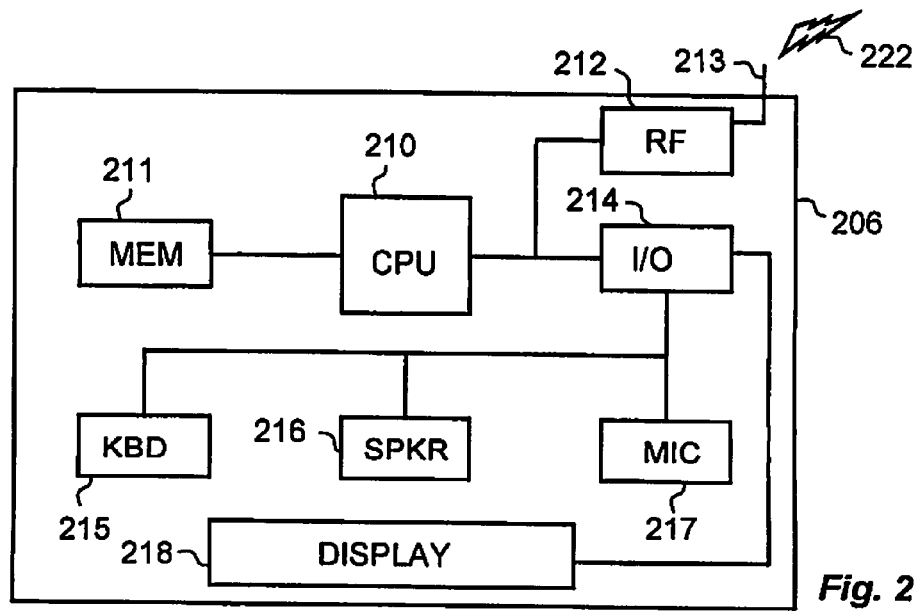
FIG. 2 schematically illustrates a mobile communication terminal.

FIG. 2 illustrates schematically a mobile communication device 206, corresponding to any of the communication devices 106 in FIG. 1. The communication device 206, which is shown in some more detail as compared to the description of the device 106 in FIG. 1, comprises a processor 210, memory 211 as well as input/output units in the form of a microphone 217, a speaker 216, a display 218 and a keypad 215 connected to the processor 210 and memory 211 via an input/output interface unit 214. Radio communication via an air interface 222 is realized by radio circuitry 212 and an antenna 213. The processor 210 makes use of software instructions stored in the memory 211 in order to control all functions of the terminal 206, including the functions to be described in detail below with regard to queuing of data packets. In other words, at least the processor and the memory form parts of an apparatus 201 that is configured to control a data packet queue as summarized above and described in detail below. Further details regarding how these units operate in order to perform normal functions within a UMTS network, such as the network 100 of FIG. 1, are known to the skilled person and are therefore not discussed further.

Figure 3:
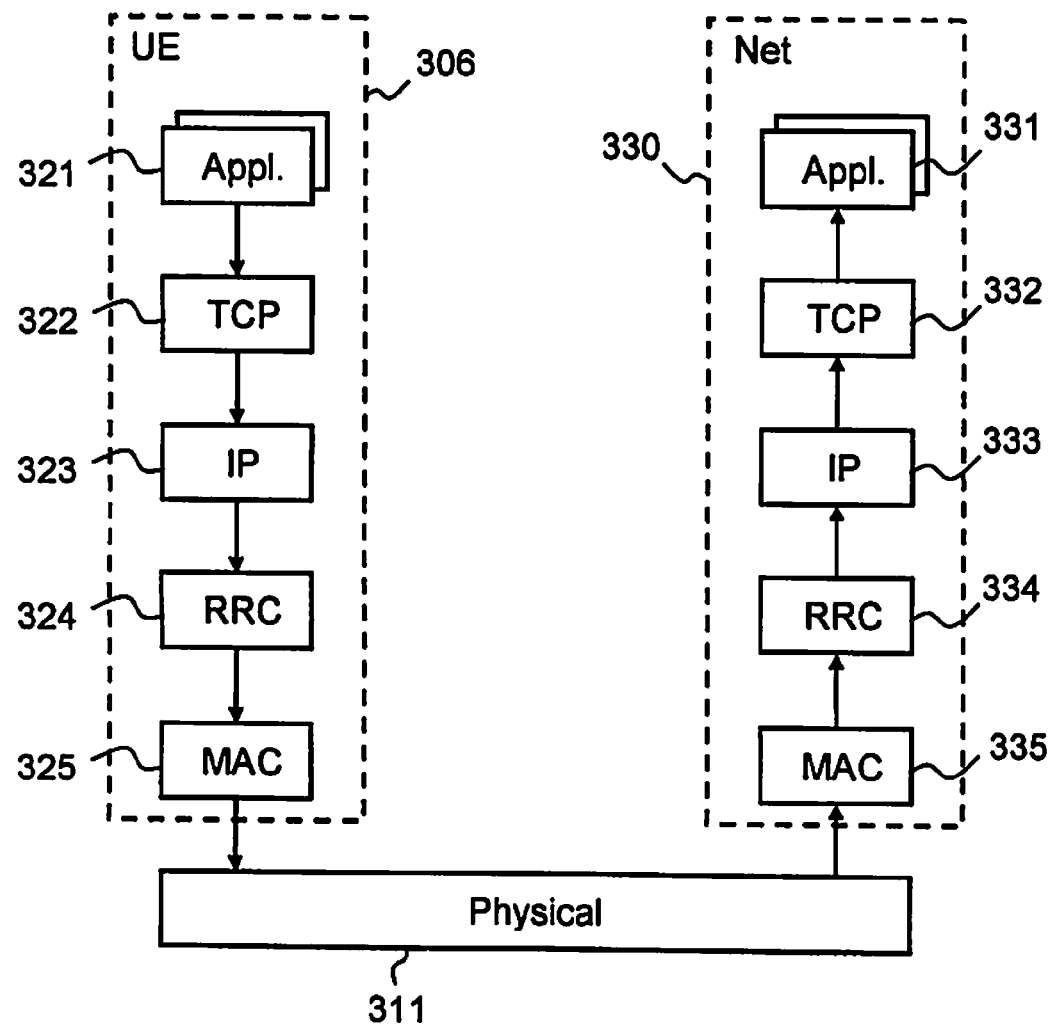
FIG. 3 schematically illustrates protocol stacks in an uplink.

FIG. 3 illustrates schematically an uplink 300 in a communication network such as the network 100 in FIG. 1. FIG. 3 shows the uplink 300 in terms of a protocol stack 306 in a mobile device, such as the device 106 in FIG. 1, and a protocol stack 330 in a network such as the network 100 in FIG. 1. One or several applications 321 in the mobile device communicate with one or several applications 331 that may reside in a server, such as the server 110 in FIG. 1. The application 321 transmits data using any suitable application protocol, including such protocols as HTTP, SMTP, SIP, FTP etc., encapsulated in TCP segments in a TCP layer 322 and IP packets in an IP layer 323. The data packets are then further encapsulated via network and data link layers 324 and 325 and transmitted across a physical radio interface 311 to the receiving stack 330 in the network where the data is extracted in reverse order in data link and network layers 335, 334, TCP/IP layers 333,332 and finally ending up as application protocol data in the application 331.

The example stack in FIG. 3 may be realized in a UMTS network such as the network 100 in FIG. 1. In such a case, network and data link layers 324,334 and 325,335 are the radio resource control (RRC) and the media access control (MAC) layers, respectively.

As indicated above, upgrades of UMTS networks such as the network 100 in FIG. 1 are currently in progress in order to provide even higher data rates and decreased transmission delays. These will be achieved by further enhancements to HSPA (e-HSPA), and the Long Term Evolution (LTE) will allow utilizing wider frequency bands. Common for these technologies are the existence of a high speed wireless link that is shared by all mobile terminals, i.e. devices 106a and 106b in the example network 100 of FIG. 1, in a cell. The transmission on this shared channel is controlled from the network 100 by a scheduler performing a scheduling function, preferably located in an RNC 104 that works according to network specific algorithms. The scheduler transmits channel access grants to the mobile terminals in the cell to control who is allowed to use the shared channel. This access grant process signaling is very fast and access grant may be changed between terminals several times per second. The scheduler algorithm, the number of active mobile terminals and the current radio resource situation in the cell is unknown to the mobile terminal. This results in that the wireless link as seen from a mobile terminal could have large rate variations and may in worst case change from several Mbps to a few hundred Kbps several times every second.

Referring also to FIG. 2, illustrating in more detail a mobile terminal 206 corresponding to any of the mobile terminals 106 in FIG. 1, queuing of data packets is performed by the processor 210 making use of part of the memory 211 as a queue memory. The queuing of packets may be performed, in terms of the protocol stack illustrated in FIG. 3, at any layer between the TCP layer 322 and the physical link 311. For example, the queuing may be implemented such that IP packets are queued at the IP layer 323 before they are transmitted further upstream to the RRC layer 324.

Figure 4:
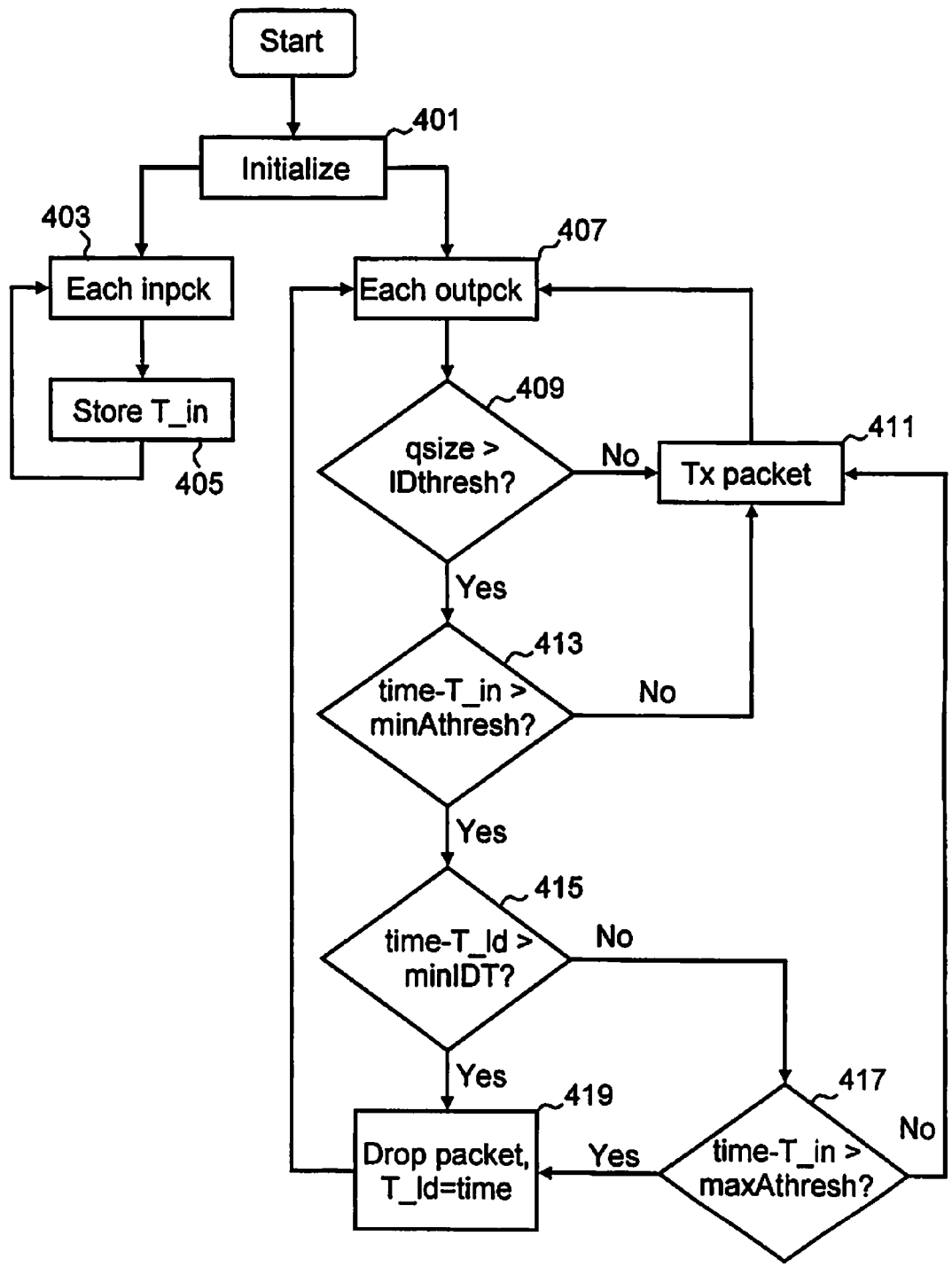
FIG. 4 is a flow chart of a queuing algorithm.

Turning now to FIG. 4, such queuing will be described in terms of an algorithm that processes TCP packets on an uplink in a UMTS system. The algorithm is illustrated by way of a flow chart that may be realized by the skilled person by way of providing suitably configured software instructions into memory circuits of a mobile terminal, such as the terminal 206 in FIG. 2.

The algorithm defines four parameters. A first threshold parameter, denoted the minAgeThreshold, defines the time a packet is allowed to stay in the queue. If an outgoing packet exceeds this time, the packet is dropped. To avoid multiple consecutive drops, a second threshold parameter is defined as a drop separation parameter, denoted the minInterDropTime, prevents the algorithm to make a second drop before a certain time has passed. In situations with varying bandwidth, the buffer might however be extremely over-dimensioned at times when the bandwidth is reduced very much, i.e. for large down-switches. Therefore, a third threshold parameter, denoted the maxAgeThreshold, which is independent of the minInterDropTime, is defined to allow burst drops in such cases. Finally a fourth threshold parameter, denoted the lowerDropThreshold, prevents the algorithm to drop a packet if the buffer contains less than a certain number of packets. This results in that the buffer always contains a sufficient number of packets to trigger a TCP fast retransmit.

The algorithm starts in an initialization step 401 where all necessary parameters, i.e. the four threshold parameters as well as internal counters etc., are initialized. Specific values of the parameters will be discussed below in connection with a discussion of results from test runs.

For each incoming data packet, the time of arrival, i.e. the time of storage into the queue, is stored. This is illustrated by the loop of steps 403 and 405. This loop of time recording continues independent of the steps making up a control loop 407-419 for the queued outgoing data packets that are intended for transmission on the uplink.

As illustrated by block 407, each outgoing packet is considered, not necessarily in sequence but possibly also in parallel. The current size of the queue is obtained and in a comparison step 409 it is compared with the fourth threshold parameter (the lowerDropThreshold). If it is found that the current size of the queue is not larger than the lowerDropThreshold, then the packet is transmitted in a transmission step 411, otherwise the algorithm continues by obtaining a value representing the current time and compares, in a comparison step 413, this value with the time of storage into the queue of the packet under consideration. If the difference between the current time and time of storage into the queue is not larger than the first threshold parameter (the minAgeThreshold), then the packet is transmitted in the transmission step 411.

After transmission of a packet from the queue, in the transmission step 411, the next queued packet is processed as illustrated by the return arrow between step 411 and step 407.

If, on the other hand, the difference between the current time and time of storage into the queue is larger than the first threshold parameter as determined in step 413, the algorithm continues to step 415, where the current time is compared with the time when a last packet drop occurred. If the difference between the current time and the time when a last packet drop occurred is not larger than the second threshold parameter (the minInterDropTime), then the algorithm continues in a comparison step 417.

If, on the other hand, the difference between the current time and the time when a last packet drop occurred, as determined in step 415, is larger than the second threshold parameter, then the algorithm continues in a drop step 419, where the packet under consideration is dropped from the queue, and a parameter holding a value representing the time when a last packet drop occurred is updated with the value for the current time.

In the comparison step 417, the value representing the current time is compared with the time of storage into the queue of the packet under consideration. If the difference between the current time and time of storage into the queue is not larger than the third threshold parameter (the maxAgeThreshold), then the packet is transmitted in the transmission step 411.

Otherwise, if the difference between the current time and time of storage into the queue is larger than the third threshold parameter (the maxAgeThreshold), then the packet is dropped in the drop step 419.

After dropping of a packet from the queue, in the drop step 419, the next queued packet is processed as illustrated by the return arrow between step 419 and step 407.

This algorithm may also be expressed in pseudo code as follows:

```
for each outgoing packet
    if(size <= lowerDropThreshold)
        transmit packet
    else
        if((delay > minAgeThreshold AND
            now-previousDropTime > minInterDropTime))
            OR (delay > maxAgeThreshold))
                discard packet
                previousDropTime=now
        else
            transmit packet
```

The optimal values for the parameters have been derived and analyzed through tests. An optimal value for the minAgeThreshold for fixed bandwidth scenarios has been found to be 0.25-0.3 seconds. For low bandwidth levels these values however result in under-utilization of the link. Therefore, the lowerDropThreshold should preferably to be set to at least 3 packets, for example in the interval 5-6 packets, to prevent the algorithm from draining the queue and reducing the throughput.

Since different TCP versions react differently to burst drops, a general optimal value for the minInterDropTime can not be determined. The tests were made using TCP SACK and showed that a decision needs to be made whether conserving the throughput or optimizing the performance in a multi flow scenario is the most essential. The tests showed that setting it to a value of 0.7 seconds, resulted in no drops of the retransmissions and the throughput was improved. Nevertheless, for a multi flow scenario it might happen that a drop occurs from a non-dominant flow. Then, a value of 0.7 seconds might result in a heavily over dimensioned buffer which leads to increased delays and starvation of non-dominant flows. To avoid this it should then be set to a value in the order of 100 ms. The tests further showed that setting the maxAgeThreshold to a value of 1.2 seconds reduced the delay for large bandwidth down-switches. With these settings a reduction of the end-to-end delay without reduction of the throughput, was fulfilled for all the bandwidth levels in the UMTS EUL range.

Comparisons were made between the algorithm described above and passive drop-from-front buffers for different fixed bandwidth levels. The tests showed that the algorithm above improved the average end-to-end delay of up to 10 times for the lower bandwidth levels. It was seen that the passive buffering approach had to be configured for all bandwidth levels and internet delays to achieve the same performance in terms of throughput and end-to-end delay as the algorithm described above. The above algorithm, on the other hand, was configured to its optimal parameter settings regardless of internet delay and bandwidth levels. Consequently the advantage of requiring little configuration, was fulfilled.

Further tests were made in bandwidth varying scenarios, where comparisons were made between the algorithm described above and passive drop-from-front buffers. The drop-from-front approach showed very large end-to-end delays, while the above algorithm always managed to keep it down to less than 1 second. For variation scenarios with smaller changes, the above algorithm causes much smaller throughput reductions, in the order of worst case 15% but improves the average end-to-end delay with at least a factor of two as compared with the drop-from-front approach. Furthermore, the tests show a strong advantage of the above algorithm in terms of the distribution of the TCP segment round trip time (RTT). The actual RTT was found to be approximately 1 second while the drop-from-front approach shows RTTs of up to 15 seconds. The trade-off between the throughput and the end-to-end delay was clearly seen in the tests.

In even further tests, investigations were made for scenarios with multiple flows, for example a situation where several applications in a mobile terminal need to transmit data on the uplink. The results showed a clear win for the algorithm described above in multiple flow scenarios compared to the passive approach. The above algorithm successfully prevented the lock-out behavior of the non-dominant flows that was seen in the passive buffer managing case. Furthermore, a contradiction to TCP's fundamental mechanism of the initial slow-start was observed in the passive drop-from-front approach. In many cases the TCP SYN segment exceeded the initial retransmission timer and timed out in the queue due to over-buffering. This resulted in the fact that the initial slow-start phase was omitted and the TCP flow started in the congestion avoidance phase. The above algorithm was found to avoid this phenomenon.

It is to be noted that, while the description of embodiments above refers mainly to an uplink in a mobile communication system, the skilled person will readily adapt these teachings to a downlink in a mobile communication system. That is, the embodiments described are equally adaptable to enhanced uplink (EUL) and high speed downlink packet access (HSDPA) in current WCDMA systems as well as uplinks and downlinks in long term evolution (LTE) systems.

Hence, in summary, control of a data packet buffer in a communication system is described herein. Control of a data packet queue in a transmission link is shown. In the queue there is stored a plurality of received data packets that are intended for transmission over a wireless interface. Selected packets are discarded from the queue without the selected packets having been transmitted. A packet is selected for discarding depending on at least the length of time the packet has been stored in the queue. The discarding of a selected packet is effectuated on condition that at least a predetermined time period has elapsed since a previous discarding of a packet has taken place. Such a solution is advantageous in that, for varying transmission bandwidth conditions in the transmission link, it is possible to achieve good link utilization and throughput, while at the same time enabling a low end-to-end delay for packets transmitted in the link.

The invention claimed is:

1. A method of controlling a data packet queue in a transmission link in a communication system, the queue storing a plurality of received data packets intended for transmission over a wireless interface, the method comprising:
    discarding selected packets from the queue without the selected packets having been transmitted, wherein a packet is selected depending on at least a length of time the packet has been stored in the queue, and a selected packet is discarded on condition that at least a predetermined time period has elapsed since a previous discarding of a packet has taken place, and a packet is selected and discarded by at least:
    calculating a time period since a packet was last discarded from the queue without having been transmitted;
    for each packet of at least a subset of the packets in the queue, calculating a time period during which the packet has been stored in the queue; and
    for each packet of the subset, discarding the packet if the time period during which the packet has been stored in the queue is larger than a first threshold and the time period since a packet was last discarded from the queue without having been transmitted is larger than a second threshold value, the first threshold being different from the second threshold.

2. The method of claim 1, further comprising, for each packet, discarding the packet if the time period during which the packet has been stored in the queue is larger than a third threshold.

3. The method of claim 1, wherein discarding a packet is prevented in case a number of packets stored in the queue is less than a fourth threshold value.

4. The method of claim 3, further comprising calculating a round trip time that is characteristic of the wireless interface, and assigning at least the calculated round trip time to the first threshold.

5. The method of claim 1, wherein the received data packets are packets intended for transmission over an uplink in a mobile communication system.

6. The method of claim 1, wherein the received data packets are packets intended for transmission over a downlink in a mobile communication system.

7. The method of claim 1, wherein at least one of:
    the first threshold is in an interval 0.25 to 0.30 seconds, the second threshold is in an interval 0.095 to 0.105 seconds, the third threshold is in an interval 1.1 to 1.3 seconds, and the fourth threshold is at least three packets.

8. An apparatus configured to control a data packet queue memory connected to a transmission link in a communication system, the queue memory being configured to store a plurality of received data packets intended for transmission over a wireless interface in the communication system, the apparatus being configured to discard selected packets from the queue memory without the selected packets having been transmitted, being configured to select a packet depending on at least a length of time the packet has been stored in the queue, and being configured to discard a selected packet on condition that at least a predetermined time period has elapsed since a previous discarding of a packet has taken place, and being configured to:
    calculate a time period since a packet was last discarded from the queue without having been transmitted;
    calculate, for each packet of at least a subset of the packets in the queue, a time period during which the packet has been stored in the queue; and
    for the each packet of the subset, to discard the packet if the time period during which the packet has been stored in the queue is larger than a first threshold and the time period since a packet was last discarded from the queue without having been transmitted is larger than a second threshold value, the first threshold being different from the second threshold.

9. The apparatus of claim 8, configured, for each packet of the subset, to discard the packet if the time period during which the packet has been stored in the queue is larger than a third threshold.

10. The apparatus of claim 8, configured to prevent discarding of packets in case a number of packets stored in the queue is less than a fourth threshold value.

11. The apparatus of claim 8, configured to calculate a round trip time that is characteristic of the wireless interface, and to assign at least the calculated round trip time to the first threshold.

12. The apparatus of claim 8, configured to transmit the received data packets over an uplink in a mobile communication system.

13. The apparatus of claim 8, configured to transmit the received data packets over a downlink in a mobile communication system.

14. The apparatus of claim 8, wherein at least one of: the first threshold is in an interval 0.25 to 0.30 seconds, the second threshold is in an interval 0.095 to 0.105 seconds, the third threshold is in an interval 1.1 to 1.3 seconds, and the fourth threshold is at least three packets.

15. The apparatus of claim 8, wherein the apparatus is included in a mobile communication device.

16. A non-transitory computer-readable medium having stored instructions that, when executed by a computer, cause the computer to carry out a method of controlling a data packet queue in a transmission link in a communication system, the queue storing a plurality of received data packets intended for transmission over a wireless interface, wherein the method comprises:
    discarding selected packets from the queue without the selected packets having been transmitted, wherein a packet is selected depending on at least a length of time the packet has been stored in the queue, and a selected packet is discarded on condition that at least a predetermined time period has elapsed since a previous discarding of a packet has taken place, and a packet is selected and discarded by at least:

calculating a time period since a last packet was discarded from the queue without having been transmitted;

for each packet of at least a subset of the packets in the queue, calculating a time period during which the packet has been stored in the queue; and for each packet of the subset, discarding the packet if the time period during which the packet has been stored in the queue is larger than a first threshold and the time period since a packet was last discarded from the queue without having been transmitted is larger than a second threshold value, the first threshold being different from the second threshold.

17. The non-transitory medium of claim 16, wherein the method further comprises at least one of:

for each packet, discarding the packet if the time period during which the packet has been stored in the queue is larger than a third threshold;

preventing discarding a packet in case a number of packets stored in the queue is less than a fourth threshold value; and calculating a round trip time that is characteristic of the wireless interface, and assigning at least the calculated round trip time to the first threshold.

* * * * *